US012684644B2

(12) United States Patent
Xu et al.

(10) Patent No.: US 12,684,644 B2
(45) Date of Patent: Jul. 14, 2026

(54) COMMUNICATION PARAMETER ADJUSTMENT METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Yang Xu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 336 days.

(21) Appl. No.: 17/890,968

(22) Filed: Aug. 18, 2022

(65) Prior Publication Data

US 2022/0408335 A1 Dec. 22, 2022

Related U.S. Application Data

(63) Continuation of application No. PCT/CN2020/075898, filed on Feb. 19, 2020.

(51) Int. Cl.
*H04W 76/20* (2018.01)
*H04W 28/24* (2009.01)

(52) U.S. Cl.
CPC ........... *H04W 76/20* (2018.02); *H04W 28/24* (2013.01)

(58) Field of Classification Search
CPC ..... H04W 28/24; H04W 76/20; H04W 72/02; H04W 72/40; H04W 76/12; H04W 76/14; H04W 76/15; H04W 76/22; H04W 36/30
See application file for complete search history.

(56) References Cited

U.S. PATENT DOCUMENTS

2002/0116342 A1* 8/2002 Hirano ................ G06Q 10/087
705/64
2014/0269575 A1* 9/2014 Zhang .................. H04W 72/23
370/329

(Continued)

FOREIGN PATENT DOCUMENTS

CN 107734562 A 2/2018
CN 109600664 A 4/2019

(Continued)

OTHER PUBLICATIONS

Guangdong OPPO Mobile Telecommunications Corp., Ltd., EP20920394.2, Extended European Search Report, Mar. 7, 2023, 16 pgs.

(Continued)

*Primary Examiner* — Sun Jong Kim
(74) *Attorney, Agent, or Firm* — Morgan, Lewis & Bockius LLP

(57) ABSTRACT

Disclosed are a communication parameter adjustment method and apparatus, a device and a storage medium, relating to the field of mobile communications. The method comprises: sending a first instruction to a first node, wherein the first instruction is used for triggering the adjustment of quality of service (QoS) parameters, and the adjustment of the QoS parameters comprises selecting, from among multiple QoS parameter combinations, a first QoS parameter combination for activation. Resources corresponding to the QoS parameter combinations have been allocated or a corresponding connection has been established.

17 Claims, 14 Drawing Sheets

TERMINAL

NETWORK DEVICE

STEP 501, A FIRST TERMINAL SENDS A FIRST INSTRUCTION TO THE NETWORK DEVICE

STEP 502, THE NETWORK DEVICE RECEIVES THE FIRST INSTRUCTION SENT BY THE FIRST TERMINAL

STEP 503, THE NETWORK DEVICE SELECTS FROM AMONG MULTIPLE QOS PARAMETER COMBINATIONS AND ACCORDING TO THE FIRST INSTRUCTION, A FIRST QOS PARAMETER COMBINATION FOR ACTIVATION

(56) References Cited

U.S. PATENT DOCUMENTS

| | | | | |
|---|---|---|---|---|
| 2016/0072880 | A1 | 3/2016 | Jacoby et al. | |
| 2018/0132129 | A1* | 5/2018 | Sitomaniemi | H04W 76/34 |
| 2018/0270715 | A1* | 9/2018 | Lee | H04L 12/4633 |
| 2019/0174360 | A1* | 6/2019 | Pang | H04W 28/16 |
| 2020/0100136 | A1* | 3/2020 | Chang | H04W 28/0252 |
| 2020/0280871 | A1* | 9/2020 | Khirallah | H04W 28/0257 |
| 2021/0014722 | A1* | 1/2021 | Han | H04W 28/0268 |
| 2021/0297905 | A1* | 9/2021 | Zhang | H04W 76/27 |
| 2021/0298040 | A1* | 9/2021 | Zhao | H04W 72/20 |
| 2023/0055739 | A1* | 2/2023 | Xue | H04W 76/22 |

FOREIGN PATENT DOCUMENTS

| | | | |
|---|---|---|---|
| WO | WO2019103688 | A1 | 5/2019 |
| WO | WO2021163932 | A1 | 8/2021 |

OTHER PUBLICATIONS

Lenovo Motorola Mobility, "QoS management for NR V2X", R2-1901053, Revision of R2-1817118, 3GPP TSG-RAN WG2 Meeting #105, Athens, Greece, Feb. 25-Mar. 1, 2019, 6 pgs.

Guosheng Zhu et al., "A Supervised Learning Based QoS Assurance Architecture for 5G Networks", IEEE Access, Received Feb. 24, 2019, accepted Mar. 17, 2019, date of publication Mar. 25, 2019, date of current version Apr. 13, 2019, 9 pgs. Digital Object Identifier 10.1109/ACCESS.2019.2907142.

ETSI TS 138 300 V15.7.0 (Oct. 2019), 5G; NR; Overall description; Stage-2 (3GPP TS 38.300 version 15.7.0 Release 15), Reference RTS/TSGR-0238300vf70, 102 pgs.

3GPP TS 23.502 V0.1.1 (Jan. 2017), "3rd Generation Partnership Project; Technical Specification Group Services and System Aspects; Procedures for the 5G System; Stage 2; (Release 15)", 46 pgs.

Guangdong OPPO Mobile Telecommunications Corp., Ltd., International Search Report and Written Opinion, PCTCN2020075898, Nov. 27, 2020, 14 pgs.

Opp et al., Correction on the binding mechanism 3GPP TSG-WG SA2 Meeting #137E S2-2002079, Feb. 24-27, 2020, Elbonia, 3 pgs.

Guangdong OPPO Mobile Telecommunications Corp., Ltd., EP20920394.2, First Office Action, Jul. 2, 2024, 7 pgs.

* cited by examiner

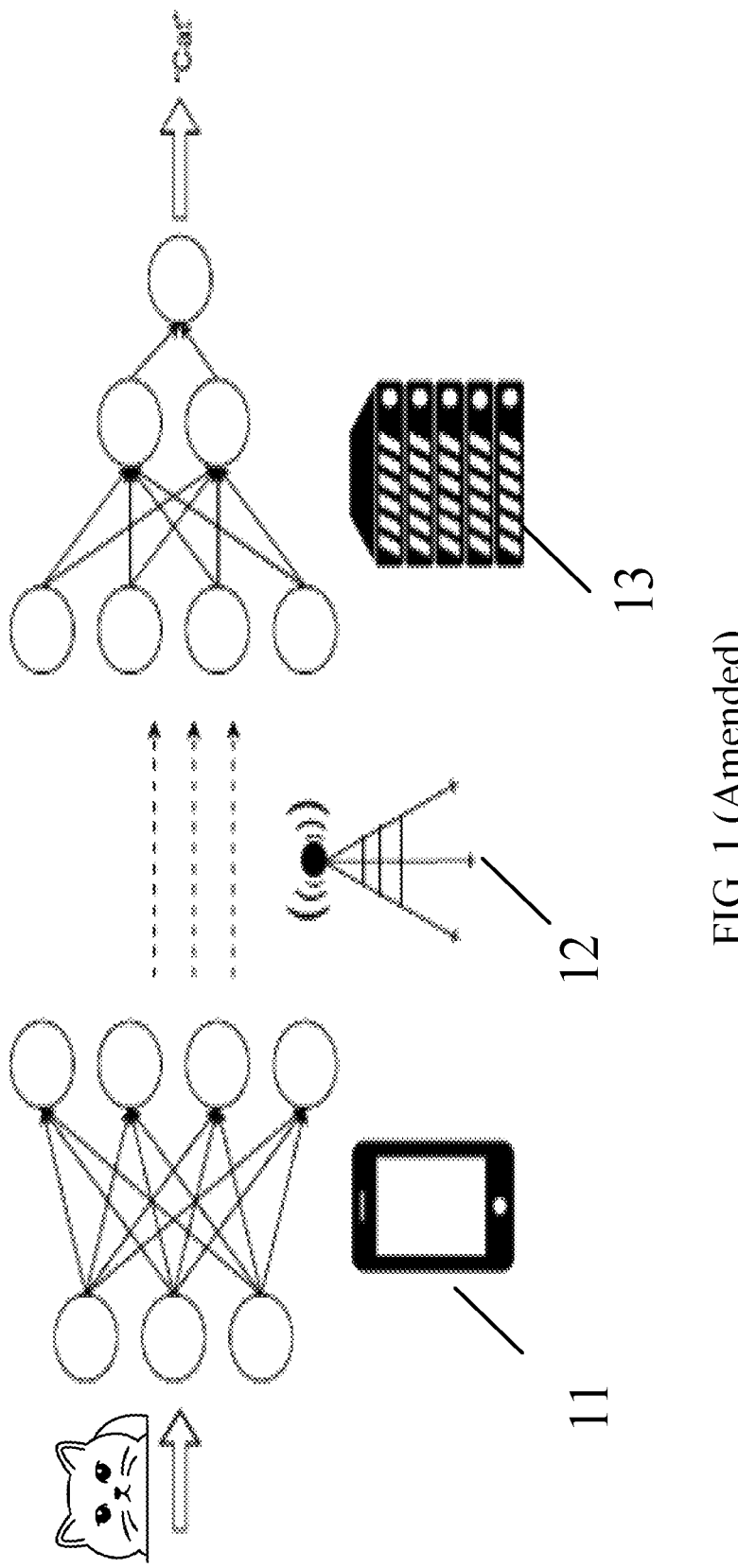
FIG. 1 (Amended)

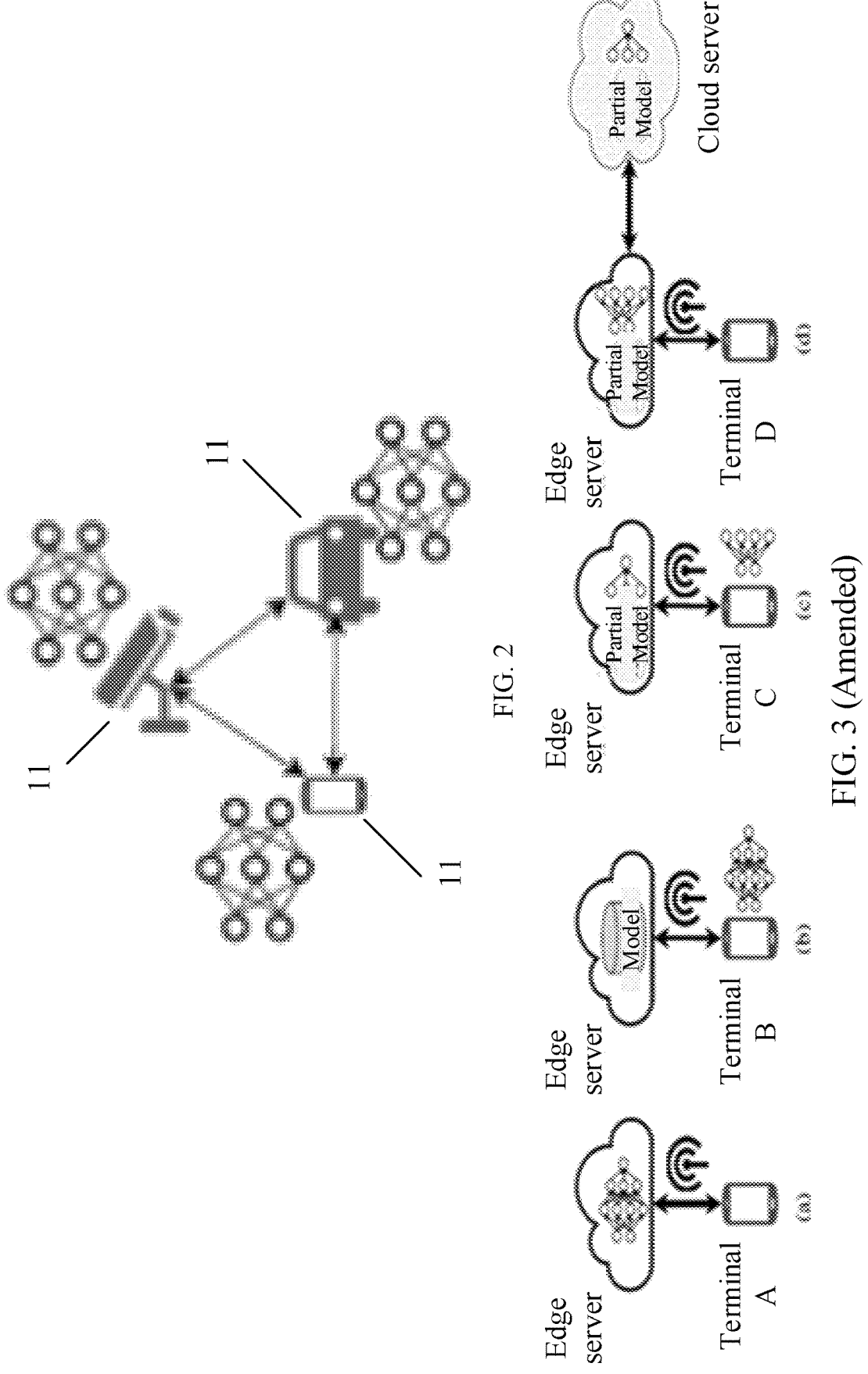
FIG. 2
FIG. 3 (Amended)

COMMUNICATION PARAMETER ADJUSTMENT METHOD AND APPARATUS, DEVICE AND STORAGE MEDIUM

CROSS-REFERENCE TO RELATED APPLICATION

This application is a continuation application of PCT Patent Application No. PCT/CN2020/075898, entitled "COMMUNICATION PARAMETER ADJUSTMENT METHOD AND APPARATUS, DEVICE AND STORAGE MEDIUM" filed on Feb. 19, 2020, which is incorporated herein by reference in its entirety.

TECHNICAL FIELD

The present application relates to the field of mobile communications, and in particular, to a method and apparatus for adjusting a communication parameter, a device, and a storage medium.

BACKGROUND

Currently, terminals and network devices need to communicate to ensure data exchange. During the communication, it is necessary to ensure the communication quality so as to realize data exchange. Therefore, in order to ensure the transmission quality, one or more Quality of Service (QoS) data streams need to be established, and different QoS data streams correspond to different QoS parameters.

In the related art, the network device triggers a session establishment process (or a session modification process), and establishes the QoS data stream through the session establishment process (or the session modification process), so as to bind the data packet filter to the QoS data stream. The data packet filter is used to filter uplink or downlink data packets transmitted on the user plane and conforming to the characteristics of data packets. However, if the terminal needs to modify the parameter in the QoS data stream, modify the data packet filter, or needs to establish a new QoS data stream, the terminal needs to execute the session establishment process (or the session modification process) again. The execution time is too long, which affects the communication quality.

SUMMARY

Embodiments of the present application provide a method and apparatus for adjusting a communication parameter, a device, and a storage medium, and provide solutions for quickly adjusting the communication parameter. The technical solutions are as follows.

According to an aspect of the present application, there is provided a method for adjusting a communication parameter, applied in a terminal, the method including:

sending a first indication to a first node, where the first indication is used for triggering an adjustment of a quality of service (QoS) parameter; the adjustment of the QoS parameter includes selecting a first QoS parameter combination from a plurality of sets of QoS parameter combinations for activation.

According to an aspect of the present application, there is provided a method for adjusting a communication parameter, applied in a network device, the method including:

selecting a first QoS parameter combination from a plurality of sets of QoS parameter combinations to activate;

where the plurality of sets of QoS parameter combinations correspond to one connection, or each set of QoS parameter combination in the plurality of sets of QoS parameter combinations corresponds to one connection.

According to an aspect of the present application, there is provided an apparatus for adjusting a communication parameter, applied in a terminal, the apparatus including:

an indication sending module, configured to send a first indication to a first node, where the first indication is used for triggering an adjustment of a quality of service (QoS) parameter; the adjustment of the QoS parameter includes selecting a first QoS parameter combination from a plurality of sets of QoS parameter combinations to activate.

According to an aspect of the present application, there is provided an apparatus for adjusting a communication parameter, applied in network device, the apparatus including:

an activation module, configured to select a first QoS parameter combination from a plurality of sets of QoS parameter combinations for activation;

where the plurality of sets of QoS parameter combinations correspond to one connection, or each set of QoS parameter combination in the plurality of sets of QoS parameter combinations corresponds to one connection.

According to an aspect of the present application, there is provided a terminal, the terminal including: a processor; a transceiver connected to the processor; a memory for storing executable instructions of the processor; where the processing is configured to load and execute the executable instructions to implement the method for adjusting a communication parameter as described in the above aspects.

According to an aspect of the present application, there is provided a network device, the network device including: a processor; a transceiver connected to the processor; a memory for storing executable instructions of the processor; where the processor is configured to load and execute the executable instructions to implement the method for adjusting a communication parameter as described in the above aspects.

According to an aspect of the present application, there is provided a computer-readable storage medium, executable instructions are stored in the readable storage medium, and the executable instructions are loaded and executed by a processor to implement the method for adjusting a communication parameter as described in the above aspects.

The technical solutions provided by the embodiments of the present application include at least the following beneficial effects.

The present application provides a method for adjusting a communication parameter. The terminal sends a first indication to a first node, and the first indication is used for triggering an adjustment of the QoS parameter. The adjustment of the QoS parameter includes selecting a first QoS parameter combination from a plurality of sets of QoS parameter combinations or one connection to activate. Since the resource corresponding to the QoS parameter combination has been allocated or the corresponding connection has been established, the network device can activate the first QoS parameter combination or a certain connection directly according to the indication of the terminal or the network itself. The execution time is shortened, the QoS parameter adjustment efficiency is improved, and the communication quality is guaranteed.

BRIEF DESCRIPTION OF THE DRAWINGS

In order to illustrate the technical solutions in the embodiments of the present application more clearly, the following briefly introduces the drawings that are used in the description of the embodiments. Obviously, the drawings in the following description are only some embodiments of the present application. For those of ordinary skill in the art, other drawings can also be obtained from these drawings without creative effort.

FIG. 1 shows a schematic diagram of a model separation scenario provided by an exemplary embodiment of the present application;

FIG. 2 shows a schematic diagram of a fully distributed scenario provided by an exemplary embodiment of the present application;

FIG. 3 shows a flowchart of a big data analysis work provided by an exemplary embodiment of the present application;

DETAILED DESCRIPTION

Figure 4:
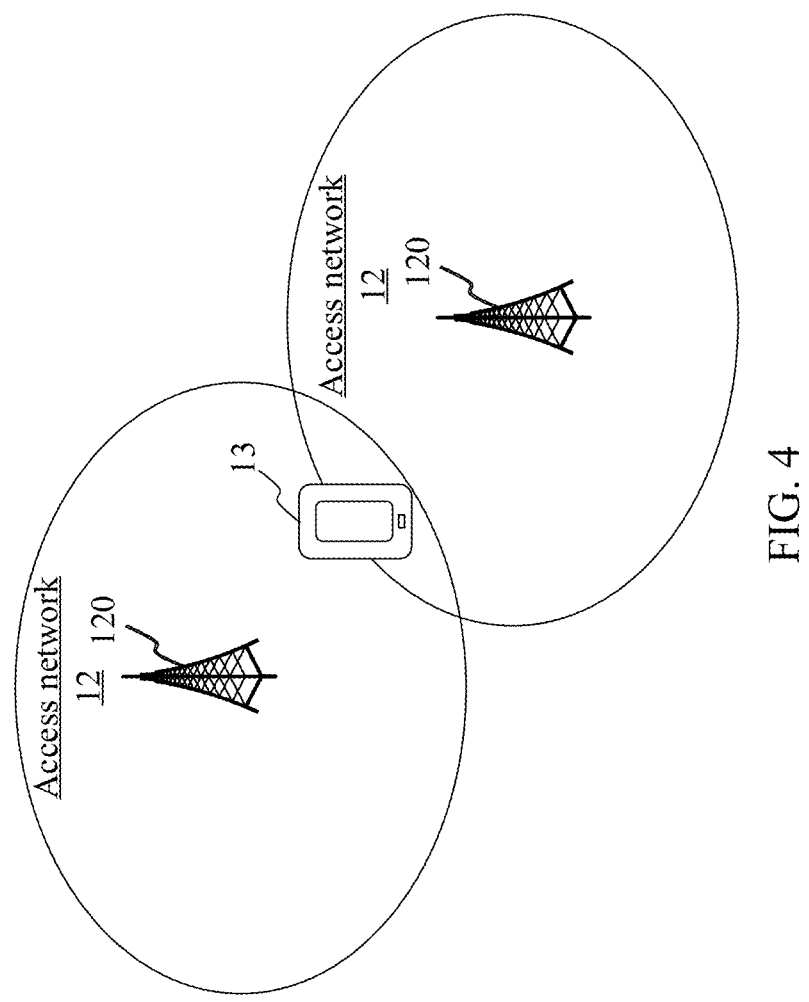
FIG. 4 shows a block diagram of a communication system provided by an exemplary embodiment of the present application.

In order to make the objectives, technical solutions and advantages of the present application clearer, the implementations of the present application will be further described in detail below with reference to the accompanying drawings.

First, the terms involved in the embodiments of the present application are briefly introduced:

1. Big data analysis work: at present, in order to improve the effect and user experience of big data analysis, multilevel AI/ML manner may be considered, and the work is divided to be carried out the network device and the terminal.

For example, as shown in FIG. 1, the terminal 11 performs partial operations on data to form intermediate state data, and sends the intermediate state data to an edge server 13 through a mobile network 12, and the edge server 13 continues the calculation.

In addition, if there are a plurality of terminals, there are many ways to perform the big data analysis work:

(1) a centralized scenario, in which after all terminals report data, the network device server processes it.

(2) a completely distributed scenario, as shown in FIG. 2, different terminals 11 locally analyze the data to be analyzed.

(3) a hybrid scenario, after the terminal analyzes the data to be analyzed locally, the analysis result is sent to the network device server, and the network device server performs further calculation.

It should be noted that, in ways (2) and (3), data interaction may also be performed between the terminals to complete the big data analysis or share the data results. In addition, as shown in FIG. 2, a connection may also be established between the terminals, and a combination of QoS parameters is quickly adjusted.

For example, as shown in FIG. 3, the big data analysis work may be distributed on the terminal, the edge server, and a cloud server, or the big data analysis work may be carried out on any one or two of them.

2. Quality of Service (QoS) parameters: different QoS Flows correspond to different QoS parameters, and the QoS parameters are used for indicating the characteristics of the QoS Flows, where the QoS parameters may include but are not limited to: a 5G QoS Identifier (5QI), an Address Resolution Protocol (ARP), a Guaranteed Traffic Bit Rate (GFBR), a Maximum Traffic Bit Rate (MFBR), a Maximum Packet Loss Rate, an End-to-End PDB, an AN-PDB, a Packet Error Rate, a Priority Level, an Averaging Window, a Resource Type, a Maximum Data Burst Volume, a UE-Aggregated Maximum Bit Rate (AMBR), a Session-AMBR, etc.

3. Data packet filter: the data packet filter includes a parameter describing the characteristics of the data packet, and may filter a specific data packet.

The data packet includes an IP data packet and an Ethernet data packet.

This IP data packet includes:

Source/destination IP address or IPv6 prefix;

Source/destination port number;

Protocol ID of the protocol above IP/Next header type;

Type of Service (TOS) (IPv4)/Traffic class (IPv6) and Mask;

Flow Label (IPv6);

Security parameter index;

Packet flow direction.

This Ethernet packet includes:

Source/destination media access control address (destination MAC address);

Ethernet type as defined (Ethertype as defined) in IEEE 802.3;

Customer-VLAN tag (C-TAG) and/or Service-VLAN tag (S-TAG) VID fields as defined in IEEE 802.1Q [98];

Customer-VLAN tag (C-TAG) and/or Service-VLAN tag (S-TAG) PCP/DEI fields as defined in IEEE 802.1Q [98];

IP Packet Filter Set, in the case that Ethertype indicates IPv4/IPv6 payload;

Packet Filter direction.

FIG. 4 shows a block diagram of a communication system provided by an exemplary embodiment of the present application. The communication system may include: an access network 12 and a terminal 13.

The access network 12 includes several network devices 120. The network device 120 may be a base station, which is an apparatus deployed in an access network to provide a wireless communication function for the terminal. The base station may include various forms of macro base station, micro base station, relay station, access point and so on. In systems using different radio access technologies, the names of devices with base station functions may vary. For example, in the LTE system, they are called eNodeBs or eNBs; in the 5G NR-U system, they are called gNodeBs or gNBs. As the communication technology evolves, the description of "base station" may change. For the convenience of the embodiments of the present application, the above-mentioned apparatuses for providing the terminal 13 with a wireless communication function are collectively referred to as an access network device.

The terminal 13 may include various handheld devices, vehicle-mounted devices, wearable devices, computing devices with wireless communication functions, or other processing devices connected to the wireless modem, as well as various forms of user equipment, Mobile Station (MS), terminal (terminal device) and so on. For the convenience of description, the devices mentioned above are collectively referred to as a terminal. The access network device 120 and the terminal 13 communicate with each other through a certain air interface technology, such as a Uu interface.

The technical solutions of the embodiments of the present application may be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, an LTE Time Division Duplex (TDD) system, an Advanced long term evolution (LTE-A) system, a New Radio (NR) system, an evolution system of NR system, an LTE-based access to unlicensed spectrum (LTE-U) system, an NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, traditional communication systems support a limited number of connections, which are easy to be implemented. However, with the development of communication technology, the mobile communication system will not only support traditional communication, but also support, for example, Device to Device (D2D) communication, Machine to Machine (M2M) communication, Machine Type Communication (MTC), Vehicle to Vehicle (V2V) communication and Vehicle to everything (V2X) system, etc. The embodiments of the present application may also be applied to these communication systems.

Figure 5:
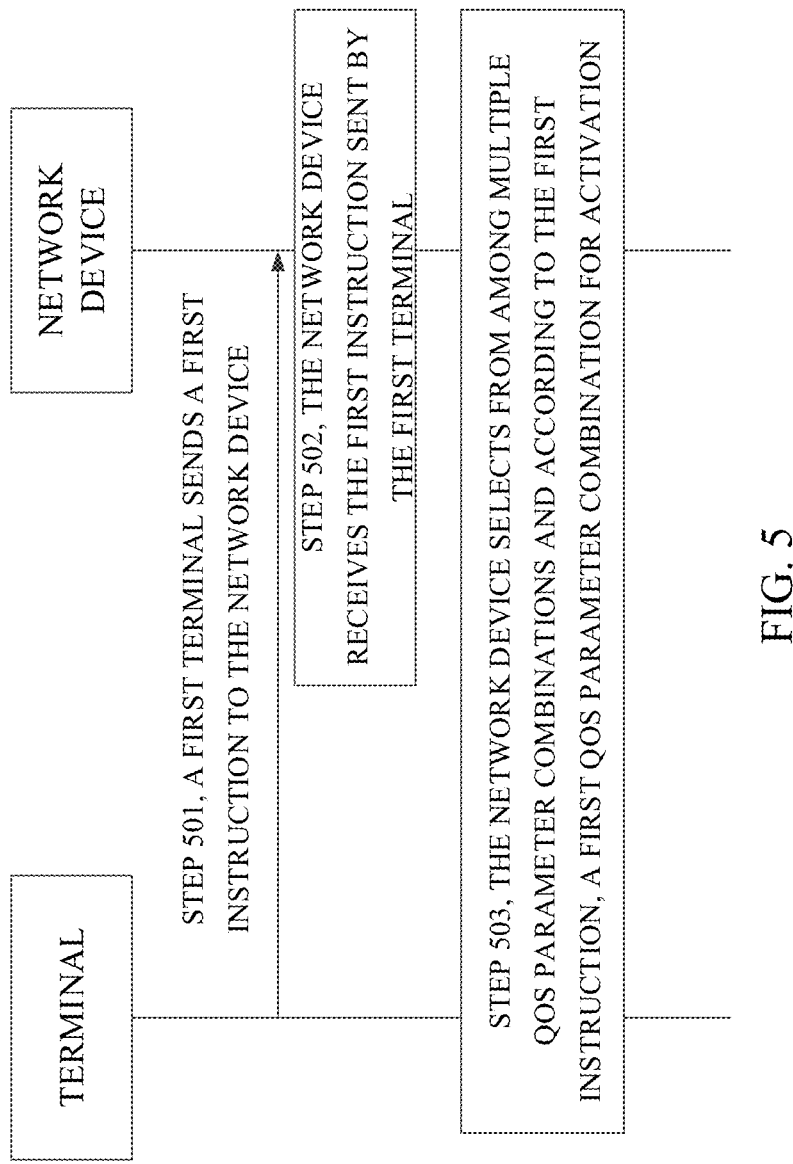
FIG. 5 shows a flowchart of a method for adjusting a communication parameter provided by an exemplary embodiment of the present application.

FIG. 5 shows a flowchart of a method for adjusting a communication parameter provided by an exemplary embodiment of the present application, which is applied to the terminal and the network device shown in FIG. 4, and the method includes at least part of the following contents.

In step 501, the first terminal sends a first indication to the network device.

The first indication is used for triggering adjustment of a QoS parameter. In addition, the adjustment of the QoS parameter includes selecting a first QoS parameter combination from a plurality of sets of QoS parameter combinations for activation.

Different QoS parameter combinations apply to different services. When the services processed by the terminal are different, the communication qualities required for communication with the network device are also different. When the service processed by the terminal changes, the terminal needs to trigger the adjustment of the QoS parameter, in order to ensure that the terminal adopts an appropriate QoS parameter combination to communicate with the network device.

In a possible implementation manner, the first indication is used for indicating to select a first connection to be activated from a plurality of connections, and each connection in the plurality of connections corresponds to one set of QoS parameter combination.

Among them, the connection is a connection for transmitting user data (such as data related to the big data model). As a possible scenario, it may be a connection between a terminal and a base station, or a connection between the terminal and a core network user plane network element (such as User Plane Function (UPF)).

A plurality of connections are established between the first terminal and the network device, and each connection corresponds to one set of QoS parameter combination, then when the service processed in the first terminal changes, the first terminal may select and activate a first connection from the plurality of connections, thereby changing the adopted QoS parameter combination. In addition, the connection between the first terminal and the network device is a channel for transmitting a data packet, and the data packets belonging to the same connection may correspond to the same connection identifier, and the connection identifier may be added to a header of the transmitted data packet to indicate that the data packet is transmitted on a connection corresponding to the corresponding connection identifier.

It should be noted that the connection in the embodiment of the present application may also be a connection between the first terminal and the second terminal. A plurality of connections are established between the first terminal and the second terminal, and the mechanism of the plurality of connections between the first terminal and the second terminal is the same as the mechanism of the connection between the first terminal and the network device, which is not elaborated here.

In a possible implementation manner, an air interface is used for connection between the first terminal and the second terminal, or a DRB is used for connection between the first terminal and the first terminal.

In some embodiments, the same group of data packet filters corresponds to a plurality of connections, and each connection in the plurality of connections corresponds to one set of QoS parameter combination. In addition, only one connection may be activated at one time point, and other connections are in a deactivated state.

As shown in Table 1, this Table 1 shows that the same group of data packet filters corresponds to a plurality of connections, and each of the plurality of connections corresponds to one set of QoS parameter combination.

TABLE 1

| Characteristic parameters of data packet filter | Connection identifier | QoS parameter combination |
| --- | --- | --- |
| Source IP address = 1111; Source port number = 80; Destination IP address = 2222; Destination port number = 80 | Connection identifier = 001 | 5QI = 10, GFBR = 1 Mb/s, MFBR = 3 Mb/s, Maximum Packet Loss Rate = 10 Kb/s |
| | Connection identifier = 002 | 5QI = 10, GFBR = 2 Mb/s, MFBR = 3 Mb/s, Maximum Packet Loss Rate = 20 Kb/s, End-to-end PDB = 10 ms |
| | Connection identifier = 003 | 5QI = 10, ARP = 1, GFBR = 2 Mb/s, MFBR = 3 Mb/s, Maximum Packet Loss Rate = 50 Kb/s, End-to-end PDB = 5 ms |
| | Connection identifier = 004 | 5QI = 10, ARP = 1, GFBR = 10 Mb/s, Maximum Packet Loss Rate = 10 Kb/s |

Figure 6:
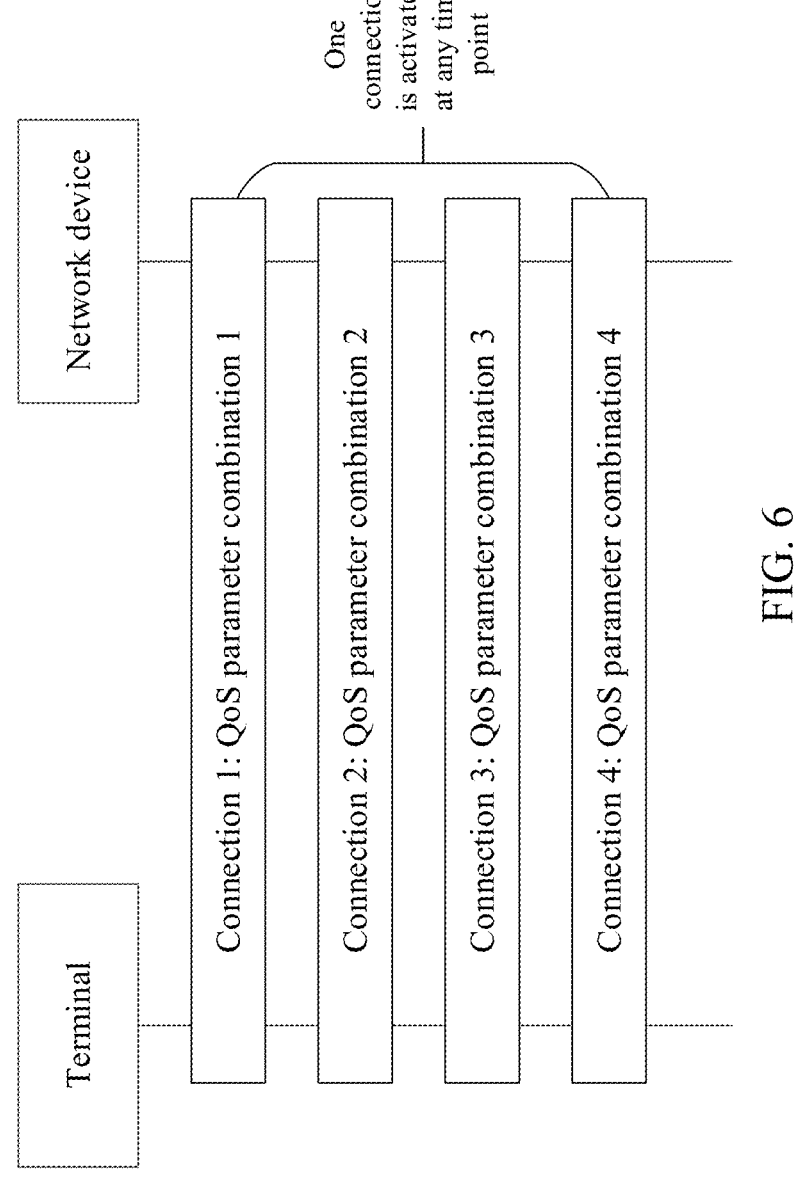
FIG. 6 shows a schematic diagram of establishing a connection between a terminal and a network device provided by an exemplary embodiment of the present application.

For example, as shown in FIG. 6, four connections are established between the first terminal and the network device, and the network device has allocated the resources of the four connections. At any time point, one or more connections in the four connections may be selected to be activated. "Connection is activated" may be understood as currently using a certain connection to transmit a specific data packet, the data packet being a data packet of a data packet filter that can match the connection.

In another possible implementation manner, the first indication is used for indicating to select and activate a first QoS parameter combination from a plurality of sets of QoS parameter combinations, and the plurality of sets of QoS parameter combinations correspond to one connection.

One connection is established between the first terminal and the network device, and the connection corresponds to a plurality of sets of QoS parameter combinations, then when the service processed in the first terminal changes, the first terminal may select and activate the first QoS parameter combination from the plurality of sets of QoS parameter combinations, so as to change the adopted QoS parameter combination. In addition, only one QoS parameter combination is activated at one time point, and the other QoS parameter combinations are in a deactivated state. "the QoS parameter combination is activated" may be understood as the connection using a specific set of QoS parameter combination currently to transmit a specific data packet, the specific data packet being a data packet of a data packet filter that can match the connection.

In some embodiments, the same set of data packet filters corresponds to a plurality of sets of QoS parameter combinations.

As shown in Table 2, this Table 2 shows that the same group of data packet filters corresponds to a plurality of sets of QoS parameter combinations.

TABLE 2

| Characteristic parameters of data packet filter | Connection identifier | QoS parameter combination |
| --- | --- | --- |
| Source IP address = 1111; Source port number = 80; Destination IP address = 2222; Destination port number = 80 | Connection identifier = 001 | 5QI = 10, GFBR = 1 Mb/s, MFBR = 3 Mb/s, Maximum Packet Loss Rate = 10 Kb/s |
| | | 5QI = 10, GFBR = 2 Mb/s, MFBR = 3 Mb/s, Maximum Packet Loss Rate = 20 Kb/s, End-to-end PDB = 10 ms |
| | | 5QI = 10, ARP = 1, GFBR = 2 Mb/s, MFBR = 3 Mb/s, Maximum Packet Loss Rate = 50 Kb/s, End-to-end PDB = 5 ms |
| | | 5QI = 10, ARP = 1, GFBR = 10 Mb/s, Maximum Packet Loss Rate = 10 Kb/s |

Figure 7:
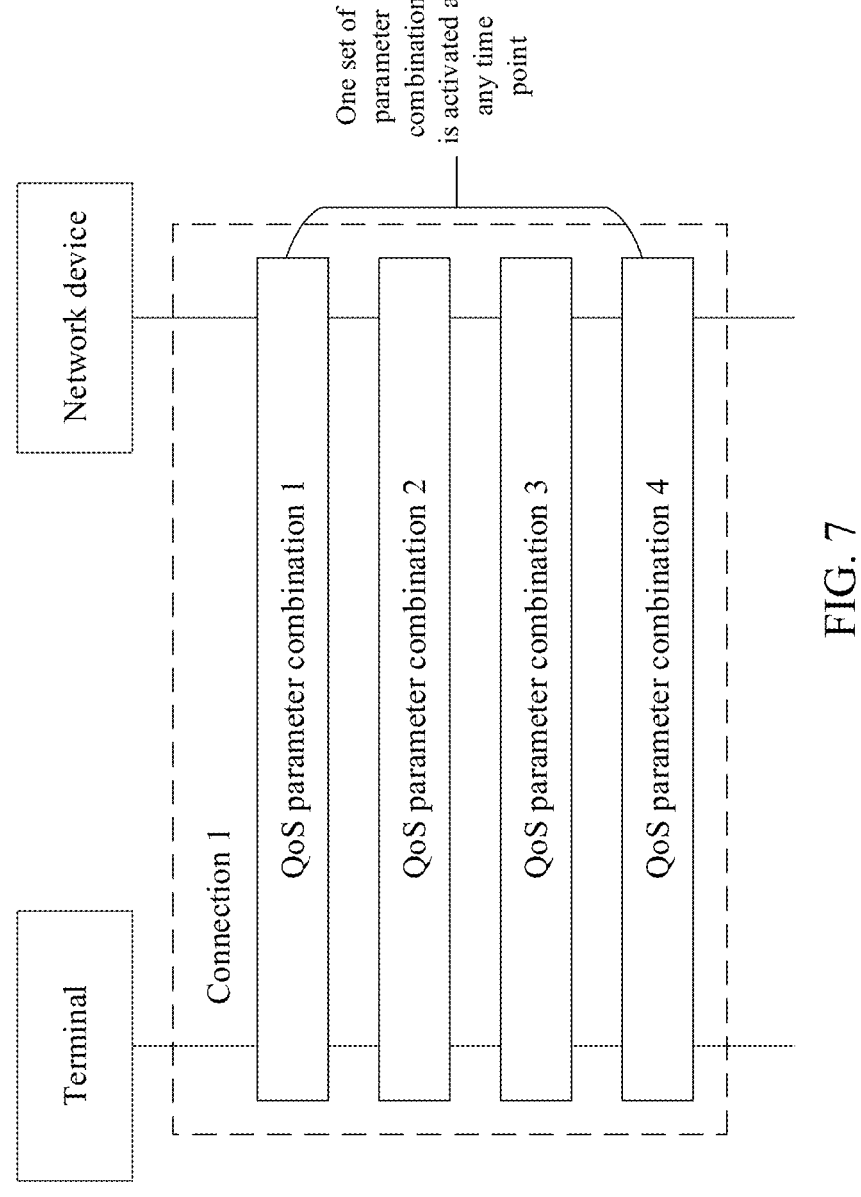
FIG. 7 shows a schematic diagram of establishing a connection between a terminal and a network device provided by an exemplary embodiment of the present application.

For example, as shown in FIG. 7, one connection is established between the first terminal and the network device, and the network device has allocated resources of four parameter combinations corresponding to the one connection. At any point in time, one or more parameter combinations in the four parameter combinations may be selected to be activated.

In a possible design, the first indication further includes a trigger condition, and the trigger condition is a condition for triggering activation of the QoS parameter combination between the first terminal and the network device.

In some embodiments, the trigger condition is time, and when the current time is the time in the first indication, the first terminal and the network device start to adjust the QoS parameter combination.

In a possible implementation manner, the time may be understood as a moment, and when the current time is the moment included in the first indication, the trigger condition is satisfied. Alternatively, the time may be understood as a time period, and when the current time is within the time period included in the first indication, the trigger condition is satisfied.

In some embodiments, the trigger condition includes a location, and when the first terminal is located at the location in the first indication, the first terminal and the network device start to adjust the QoS parameter combination.

In a possible implementation manner, the location may be Global Positioning System (GPS) coordinates, a cell identity, a base station identity, a Tracking Area Identity (TAI), a TAI list, and so on.

It should be noted that the connection in the embodiment of the present application may also be a connection between the first terminal and the second terminal. One connection is established between the first terminal and the second terminal, and the connection corresponds to a plurality of sets of QoS parameter combinations. Moreover, the mechanism for the connection corresponding to a plurality of sets of QoS parameter combinations is consistent with the mechanism for establishing one connection between the first terminal and the network device, and details are not described herein again.

The embodiments of the present application relate to a same group of data packet filters, the same group of data packet filters means that the data packet filters in individual connections are the same, that is, the identifiers of the data packet filters in individual connections are the same. Alternatively, the same group of data packet filters means that the identifiers of the data packet filters in individual connections are different, but the data packet filters in individual connections correspond to the same parameter.

In addition, the plurality of sets of QoS parameter combinations and one or more connections corresponding to the plurality of sets of QoS parameter combinations in the embodiments of the present application may be triggered to be established by the network device. In addition, the process for the network device to establish the plurality of sets of QoS parameter combinations and one or more connections corresponding to the plurality of sets of QoS parameter combinations will be described in the following embodiments.

In some embodiments, the plurality of sets of QoS parameter combinations are used for establishing an air interface data resource bearing (DRB), and the resources required by a plurality of DRBs are allocated by the network device.

In a possible implementation manner, one set of QoS parameter combination may correspond to one DRB. Alternatively, a plurality of sets of QoS parameter combinations correspond to one DRB.

It should be noted that the plurality of sets of QoS parameter combinations in the embodiments of the present application are generated by the network device through a session establishment process or a session modification process.

In addition, the session establishment process or the session modification process is described in the following embodiments.

In a possible implementation manner, the network device in the embodiments of the present application includes a base station and a core network network element, and the terminal may send a first indication to the base station to trigger an action of adjusting the QoS parameter, or the terminal may send a first indication to the core network network element to trigger the action of adjusting the QoS parameter. The terminal may send the first indication to the base station through a message of any layer in the air interface protocol, such as a physical layer, a Media Access Control Address (MAC) layer, a Radio Link Control (RLC) layer, a Radio Resource Control (RRC) layer, which is not limited here. The lower the protocol, the sooner the protocol can be notified to the base station side, so as to make adjustments more quickly. The terminal may send the first indication to the core network network element through the control plane or the user plane. If the control plane is used, the NAS message may be used. If the user plane is used, the first indication may be carried through the SDAP layer protocol of the air interface, and then sent to the base station. The first indication is sent to the core network network element through the GTP-U layer protocol. In addition, a new layer of protocol or a new container may be introduced between the terminal and the network device, and the new protocol or new container is used for direct communication between the terminal and the network device, and other intermediate processing does not need to be performed.

In step 502, the network device receives the first indication sent by the first terminal.

After receiving the first indication from the first terminal, the network device subsequently activates the first QoS parameter combination according to the first indication.

In step 503, the network device selects a first QoS parameter combination from the plurality of sets of QoS parameter combinations to activate according to the first indication.

The plurality of sets of QoS parameter combinations correspond to one connection, or each set of QoS parameter combination in the plurality of sets of QoS parameter combinations corresponds to one connection. After receiving the first indication, the network device may select the first QoS parameter combination from the plurality of sets of QoS parameter combinations for activation according to the first indication.

In some embodiments, when a plurality of connections are established between the first terminal and the network device, the network device activates the first connection among the plurality of connections according to the first indication, and because each connection among the plurality of connections corresponds to one set of QoS parameter combination, activating one connection is to use one set of QoS parameter combination for transmission of the data packet.

The plurality of connections described above may correspond to the same IP address and/or data packet filter, that is, no matter which one of the above plurality of connections is used for transmission of the data packet, the IP address of the terminal remains unchanged and/or the used packet filter is unchanged.

In a possible implementation manner, the connection in the embodiments of the present application is a QoS data stream in a Packet Data Unit (PDU) session, and the connection established between the terminal and the network device is the established QoS data stream. The QoS data stream may belong to the same PDU session.

It should be noted that the embodiment of the present application only takes the interaction between the first terminal and the network device to activate the QoS parameter combination as an example for description. In another embodiment, the interaction between the first terminal and the second terminal is to activate the QoS parameter combination, and the interaction process between the first terminal and the second terminal is similar to the interaction process between the first terminal and the second terminal, and will not be repeated again.

In addition, both the network device and the second terminal in the embodiments of the present application may be a first node, then the first terminal sending the first indication to the first node is the first terminal sending the first indication to the network device, or, the first terminal sending the first indication to the second terminal, to subsequently realize the adjustment of the QoS parameter combination.

In the method provided by the embodiments of the present application, the terminal sends a first indication to the network device, the first indication is used for triggering adjustment of the QoS parameter, and the adjustment of the QoS parameter includes selecting a first QoS parameter combination from a plurality of sets of QoS parameter combinations or one connection for activation. Since the resource corresponding to the QoS parameter combination has been allocated or the corresponding connection has been established, the network device can activate the first QoS parameter combination or a certain connection directly according to the indication of the terminal or the network itself, which shortens the execution time, improves the QoS parameter adjustment efficiency and ensures the communication quality.

Figure 8:
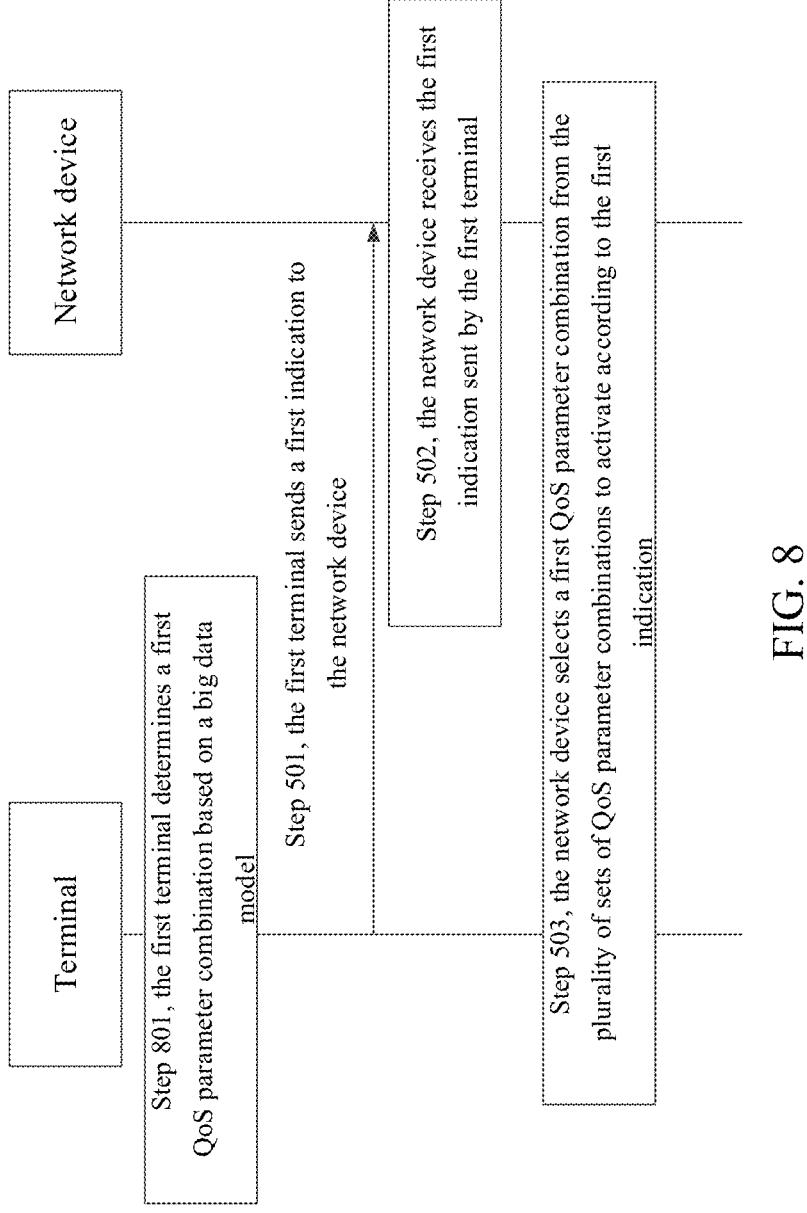
FIG. 8 shows a flowchart of a method for adjusting a communication parameter provided by an exemplary embodiment of the present application.

In an embodiment based on FIG. 5, FIG. 8 shows a flowchart of a method for adjusting a communication parameter provided by an exemplary embodiment of the present application. In this embodiment, the method further includes the following steps.

In step 801, the first terminal determines a first QoS parameter combination based on a big data model.

The big data model is a model adopted by the first terminal, and the first terminal uses the big data model to process services.

When the big data model adopted by the first terminal changes, the first terminal determines the first QoS parameter combination corresponding to the big data model based on the big data model, and subsequently the first terminal sends a first indication carrying the first QoS parameter combination or a corresponding identifier. The identifier of the QoS parameter combination may uniquely identify the QoS parameter combination, and the identifier may be a certain parameter (such as 5QI) in the QoS parameter combination or one independent identifier. In addition, it also indicates that the first QoS parameter combination to be used by the first terminal is determined based on the big data model.

In a possible implementation manner, the first terminal receives configuration information, where the configuration information includes a corresponding relationship between the big data model and the QoS parameter combination.

The first terminal determines, based on the big data model and the corresponding relationship, the first QoS parameter combination corresponding to the big data model.

For example, the corresponding relationship is shown in Table 3.

TABLE 3

| Big data model a | QoS parameter combination 1 |
| Big data model b | QoS parameter combination 2 |
| Big data model c | QoS parameter combination 3 |
| Big data model d | QoS parameter combination 4 |

When the identifier of the big data model adopted by the first terminal is a, it is determined that the QoS parameter combination corresponding to the big data model 1 is QoS parameter combination 1.

Among them, the identifier of the big data model may correspond to a complete model (such as a completed Deep Neural Networks (DNN) model or Convolutional Neural Networks (CNN) model), the identifier of the big data model also may correspond to a part of a complete model as shown in FIG. 1, and this part is a part executed on the first terminal.

It should be noted that the embodiments of the present application are only described by taking the network device sending the corresponding relationship to the first terminal as an example. In another embodiment, the corresponding relationship may be pre-stored in the terminal, and there is no need for the network device to send the corresponding relationship to the first terminal.

Figure 9:
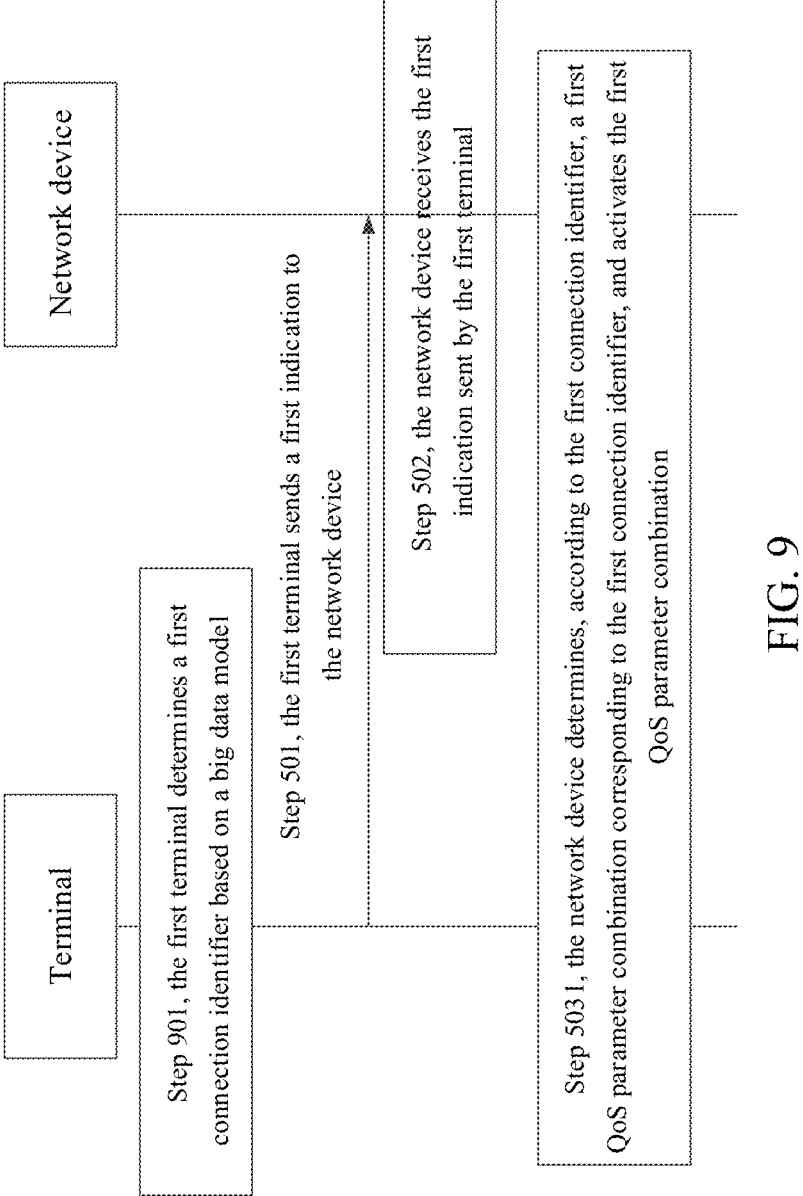
FIG. 9 shows a flowchart of a method for adjusting a communication parameter provided by an exemplary embodiment of the present application.

In an embodiment based on FIG. 5, FIG. 9 shows a flowchart of a method for adjusting a communication parameter provided by an exemplary embodiment of the present application. In this embodiment, the method further includes: step 901, and step 503 is replaced by step 5031.

In step 901, the first terminal determines a first connection identifier based on a big data model.

When the big data model adopted by the first terminal changes, the first terminal determines, based on the big data model, a first connection identifier corresponding to the big data model, the first terminal sends the first indication carrying the first connection identifier subsequently. Alternatively, the first connection identifier corresponds to the first QoS parameter combination. In addition, it also indicates that the first connection identifier of the first terminal is determined based on the big data model. As an example, the first connection identifier may be a QoS data stream identifier.

In a possible implementation manner, the first terminal receives configuration information, where the configuration information includes a corresponding relationship between the big data model and the connection identifier.

The first terminal determines a first connection identifier corresponding to the big data model based on the big data model and the corresponding relationship.

For example, as shown in Table 4:

TABLE 4

| Big data model a | Connection identifier 1 |
| Big data model b | Connection identifier 2 |

13

TABLE 4-continued

| Big data model c | Connection identifier 3 |
|---|---|
| Big data model d | Connection identifier 4 |

When the identifier of the big data model adopted by the first terminal is a, it is determined that the first connection identifier corresponding to the big data model a is connection identifier 1.

Among them, the identifier of the big data model may correspond to a complete model (such as a completed Deep Neural Networks (DNN) model or Convolutional Neural Networks (CNN) model), and the identifier of the big data model also may correspond to a part of a complete model as shown in FIG. 1, this part being a part executed on the terminal.

It should be noted that the embodiments of the present application are only described by taking the network device sending the corresponding relationship to the first terminal as an example. In another embodiment, the corresponding relationship may be stored in the terminal, and there is no need for the network device to send the corresponding relationship to the first terminal.

In step 5031, the network device determines, according to the first connection identifier, a first QoS parameter combination corresponding to the first connection identifier, and activates the first QoS parameter combination.

Since the connection identifier corresponds to the QoS parameter combination, after receiving the first indication including the first connection identifier, the network device determines the corresponding first QoS parameter combination according to the first connection identifier.

Figure 10:
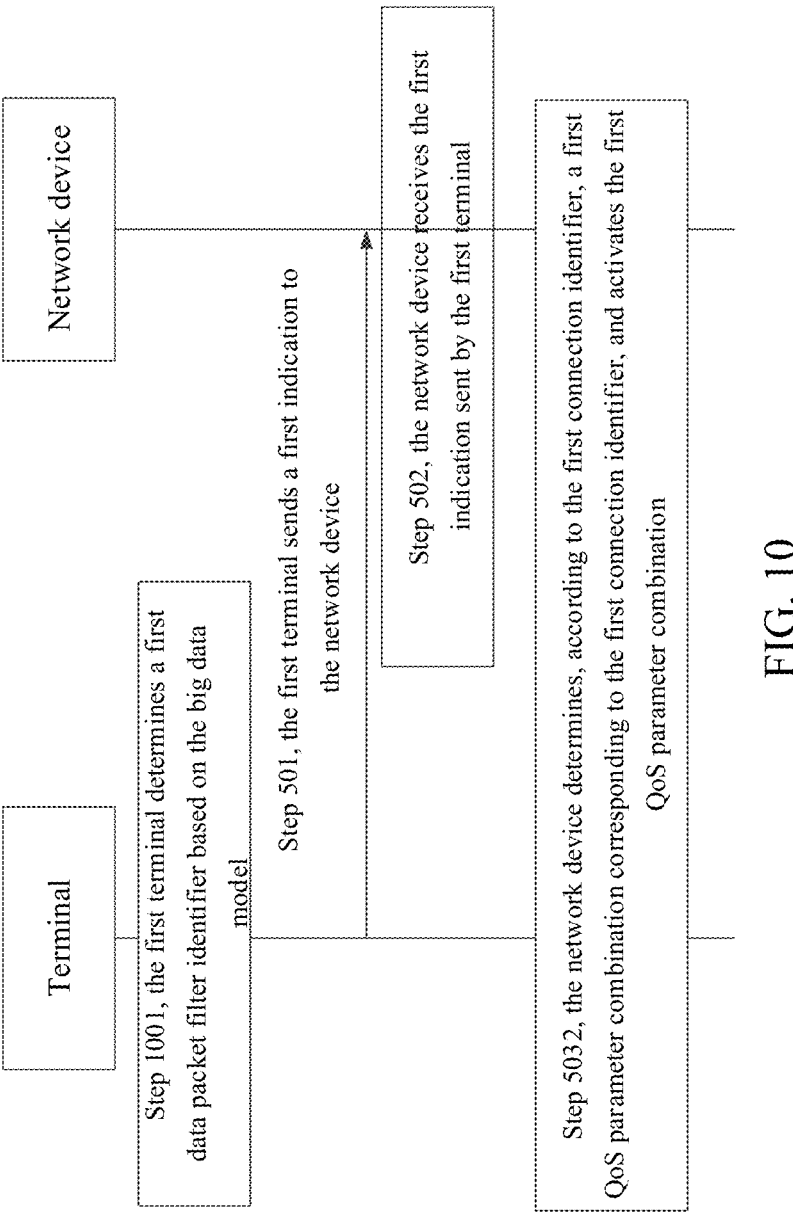
FIG. 10 shows a flowchart of a method for adjusting a communication parameter provided by an exemplary embodiment of the present application.

In an embodiment based on FIG. 5, FIG. 10 shows a flowchart of a method for adjusting a communication parameter provided by an exemplary embodiment of the present application. In this embodiment, the method further includes: step 1001, and step 503 is replaced by step 5032.

In step 1001, the first terminal determines a first data packet filter identifier based on the big data model.

When the big data model adopted by the first terminal changes, the first terminal determines, based on the big data model, the identifier of the first data packet filter corresponding to the big data model, and the first terminal subsequently sends the first indication carrying the first data packet filter identifier. In addition, it also indicates that the first data packet filter identifier of the first terminal is determined based on the big data model.

In a possible implementation manner, the first terminal receives configuration information, where the configuration information includes a corresponding relationship between the big data model and the data packet filter identifier.

The first terminal determines, based on the big data model and the corresponding relationship, a first data packet filter identifier corresponding to the big data model.

For example, the corresponding relationship is shown in Table 5:

TABLE 5

| Big data model a | Data packet filter identifier 1 |
|---|---|
| Big data model b | Data packet filter identifier 2 |
| Big data model c | Data packet filter identifier 3 |
| Big data model d | Data packet filter identifier 4 |

When the identifier of the big data model adopted by the first terminal is a, the first data packet filter identifier corresponding to the big data model a is determined to be the data packet filter identifier 1.

Among them, the identifier of the big data model may correspond to a complete model (such as a completed Deep Neural Networks (DNN) model or Convolutional Neural Networks (CNN) model), and the identifier of the big data model may also correspond to a part of the complete model as shown in FIG. 1, this part being the a part executed on the terminal.

In step 5032, the network device determines, according to the first connection identifier, a first QoS parameter combination corresponding to the first connection identifier, and activates the first QoS parameter combination.

The first point that needs to be explained is that the embodiments of the present application only take the network device sending the corresponding relationship to the first terminal as an example for description. In another embodiment, the corresponding relationship may be stored in the first terminal, and the network device does not need to send the corresponding relationship to the first terminal.

The second point that needs to be explained is that the embodiments of the present application are only described by taking the first terminal sending the first indication to the network device, and the network device activating the first QoS parameter combination according to the first indication as an example. In another embodiment, the first terminal may not send the first indication to the network device, and the network device itself determines the first QoS parameter combination from a plurality of sets of QoS parameter combinations, and activates the first QoS parameter combination.

When the network device itself decides to adjust the QoS parameter combination, the network device may also send a second indication to the first terminal, and the first terminal receives the second indication and determines the activated QoS parameter combination according to the second indication.

The second indication is used for triggering adjustment of the QoS parameter, and the adjustment of the QoS parameter includes selecting a first QoS parameter combination from a plurality of sets of QoS parameter combinations for activation.

In a possible implementation manner, after receiving the second indication, the first terminal triggers activation of a specific connection according to the second indication, or triggers activation of different QoS parameter combinations of the same connection.

The second indication is similar to the first indication in the above-mentioned embodiment, and details are not repeated here.

In addition, the second indication may include any one of a connection identifier, a QoS parameter combination, an identifier corresponding to the QoS parameter combination, a big data model identifier, a data packet filter parameter, and a trigger condition.

In another possible implementation manner, the first terminal sends the big data model identifier to the network device, and after receiving the big data model identifier, the network device determines the corresponding first QoS parameter combination according to the big data model identifier, and the network device subsequently adopts the determined first QoS parameter combination.

In addition, the manner in which the network device determines the first QoS parameter combination is similar to the manner in which the first terminal determines the first QoS parameter combination based on the identifier of the big data model in FIG. 8 to FIG. 10, and details are not repeated here.

It should be noted that in FIG. 8-FIG. 10, the interaction between the first terminal and the network device is used. In another embodiment, the first terminal may also interact with the second terminal, and the interaction process is similar to the interaction process between the first terminal and the network device, and details are not repeated here.

Figure 11:
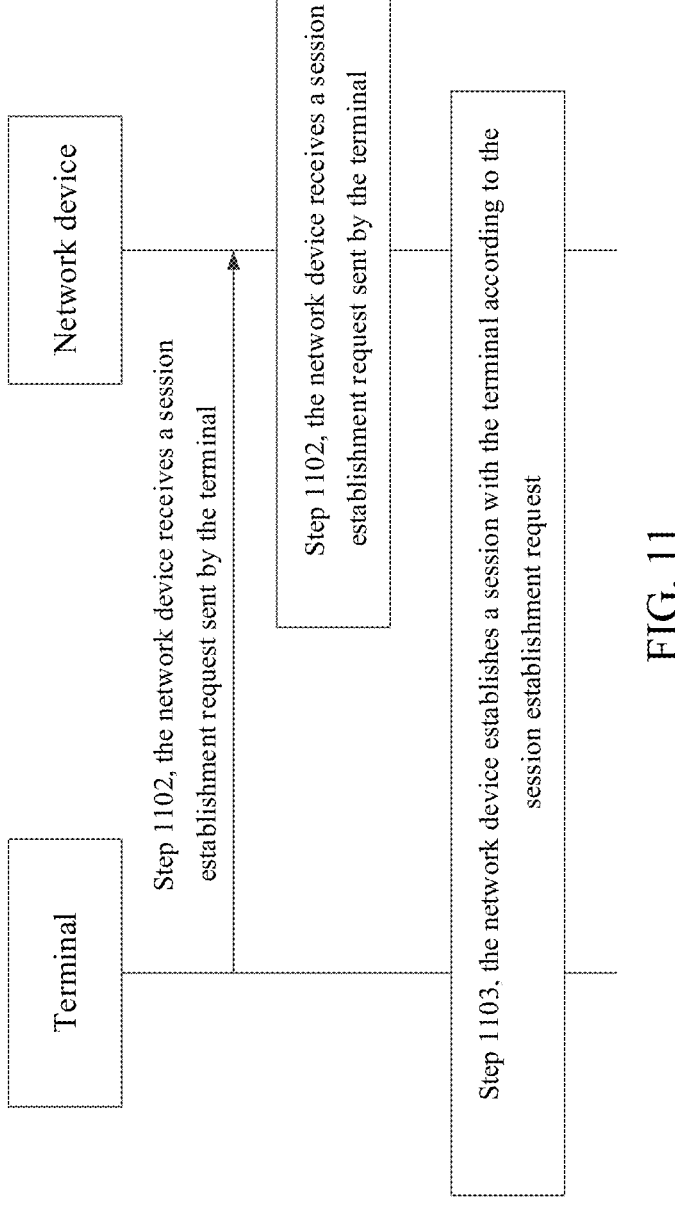
FIG. 11 shows a flowchart of a session establishment method provided by an exemplary embodiment of the present application.

In an embodiment based on FIG. 5, FIG. 11 shows a flowchart of a session establishment method provided by an exemplary embodiment of the present application. In this embodiment, steps 1101-1103 are included.

In step 1101, the terminal sends a session establishment request to the network device.

The session establishment request is used for instructing the network device to establish a session.

When communicating between the terminal and the network device, a session needs to be established between the terminal and the network device. At this time, the terminal may send a session establishment request to the network device. When the network device receives the session establishment request, the network device establishes a session with the terminal according to the session establishment request.

In a possible implementation manner, the session establishment request includes a capability indication that the terminal supports triggering adjustment of the QoS parameter, and/or includes an indication that the terminal requests to establish a plurality of sets of QoS parameters that can be activated/deactivated.

In a possible implementation manner, the network device includes a base station and a core network network element, and the core network network may establish a session with the base station and the terminal.

In some embodiments, the core network network element includes a session management network element, and the terminal sends a session establishment request to the session management network element.

In addition, the terminal may first receive the session establishment request from other core network network element in the network device, and other core network network element then forward the session establishment request.

In a possible implementation manner, the session establishment request is sent to the session management network element through a NAS message.

In step 1102, the network device receives a session establishment request sent by the terminal.

In step 1103, the network device establishes a session with the terminal according to the session establishment request.

After the network device receives the session establishment request sent by the terminal, the network device obtains information for session establishment, and then the network device may establish a session with the terminal and one or more QoS data streams in the session according to the obtained information.

In a possible implementation manner, the core network network element of the network device further includes a policy control unit and/or a subscription information network element.

After the session management network element receives the session establishment request, it interacts with the policy control unit and/or the subscription information network element, obtains a PCC rule in the policy control unit and the subscription information in the subscription information network element, and subsequently requests the base station and the terminal to establish a session according to the PCC rule and/or the subscription information.

In some embodiments, the PCC network element or the subscription information includes: at least one of a third indication, a plurality of sets of QoS parameter combinations, and one or more connections corresponding to the plurality of sets of QoS parameter combinations.

The third indication is used for instructing the terminal to allow the adjustment of the QoS parameter to be triggered.

In addition, the PCC network element or the subscription information may also include any one of the corresponding relationship between the big data model and the QoS parameter combination, the corresponding relationship between the big data model and the connection identifier, and the corresponding relationship between the big data model and the data packet filter identifier.

Figures 12, 13:
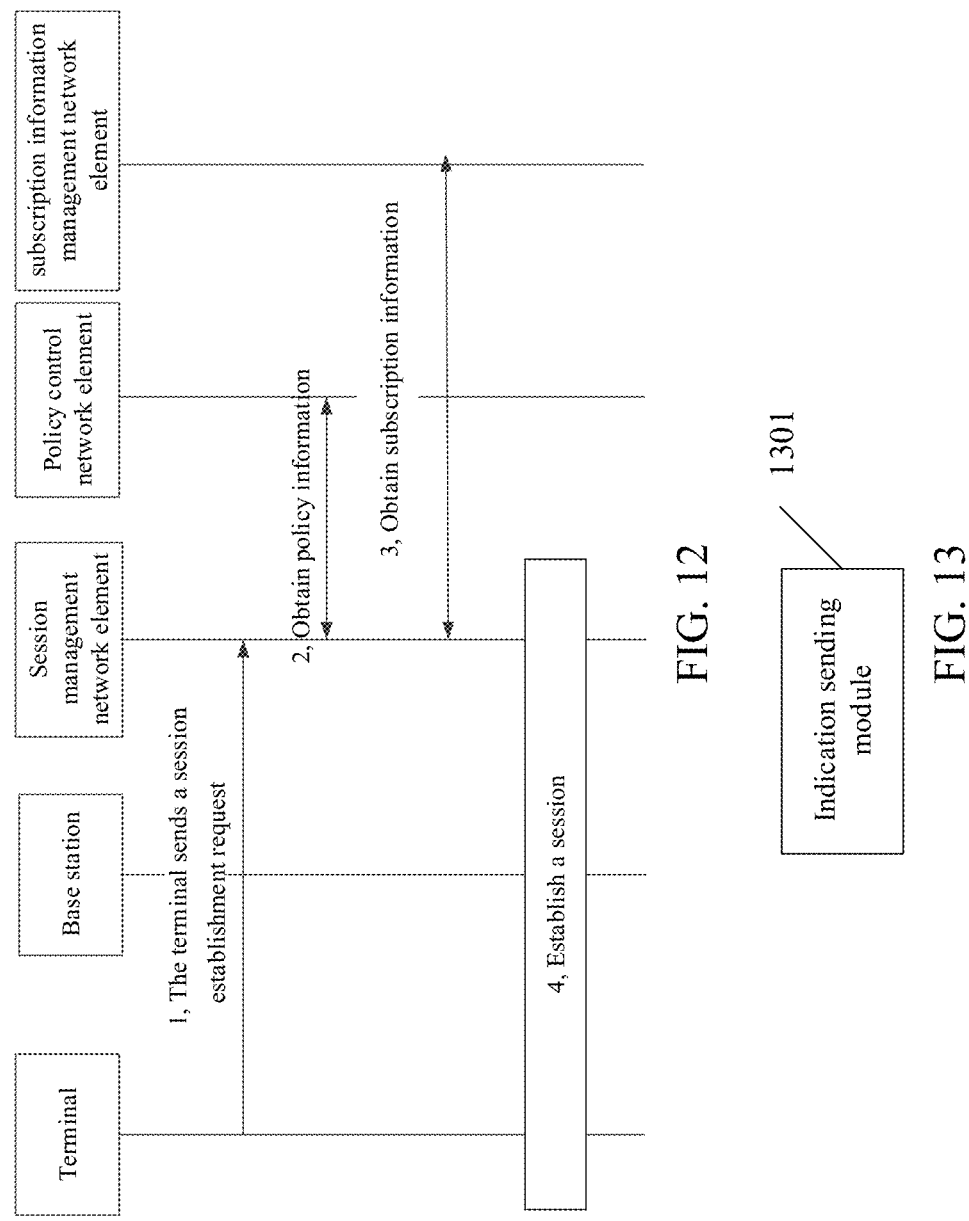
FIG. 12 shows a flowchart of interaction among a terminal, a base station, and each core network network element provided by an exemplary embodiment of the present application.
FIG. 13 shows a block diagram of a communication apparatus provided by an exemplary embodiment of the present application.

For example, as shown in FIG. 12, FIG. 12 shows the interaction process among the terminal, the base station and each core network network element to establish a flow of the session.

The first point that needs to be explained is that the embodiments of the present application are only described by taking the terminal sending a session establishment request to the network device, and the network device establishing the session according to the session establishment request as an example. In another embodiment, the terminal may send a session modification request to the network device, and the network device modifies the session according to the session modification request.

The second point that needs to be explained is that the embodiments of the present application are only described by taking the terminal sending a session establishment request to the network device, and the network device establishing the session according to the session establishment request as an example. In another embodiment, the terminal does not need to send a session establishment request to the network device, and the network device itself decides to trigger the establishment of the session with the terminal.

FIG. 13 shows a block diagram of a communication apparatus provided by an exemplary embodiment of the present application, which is applied to the terminal shown in FIG. 4, and the apparatus includes:

an indication sending module 1301, configured to send a first indication to a first node, where the first indication is used for triggering adjustment of a quality of service (QoS) parameter; the adjustment of the QoS parameter includes selecting a first QoS parameter combination from a plurality of sets of QoS parameter combinations for activation.

In one example, the first node is a network device, or the first node is a second terminal.

In one example, the plurality of sets of QoS parameter combinations correspond to one or more connections.

In one example, one or more connections are established between the first terminal and the network device, or one or more connections are established between the first terminal and the second terminal.

In one example, the plurality of sets of QoS parameter combinations are used for establishing a plurality of data radio bearers (DRBs), and a resource corresponding to each DRB is allocated by the network device.

In one example, the plurality of sets of QoS parameter combinations are established by the network device through a session establishment process or a session modification process.

In one example, the first indication is used for triggering the adjustment of the QoS parameter, including:

the first indication is used for indicating to select and activate a first connection from a plurality of connections, and each connection in the plurality of connections corresponds to one set of QoS parameter combination;

or, the first indication is used for indicating to select and activate the first QoS parameter combination from the plurality of sets of QoS parameter combinations, and the plurality of sets of QoS parameter combinations correspond to one connection.

In one example, the same set of data packet filters corresponds to a plurality of connections, and each of the plurality of connections corresponds to one set of QoS parameter combinations.

In one example, the same set of data packet filters corresponds to a plurality of sets of QoS parameter combinations.

In one example, the first QoS parameter combination is determined based on a big data model, and the big data model is a model used by the terminal.

In one example, the first connection identifier is determined based on a big data model, and the big data model is a model used by the terminal;

the first connection identifier corresponds to the first QoS parameter combination.

In one example, the first data packet filter identifier is determined based on a big data model, and the big data model is a model used by the terminal;

the first data packet filter identifier corresponds to the first QoS parameter combination.

Figures 14, 15:
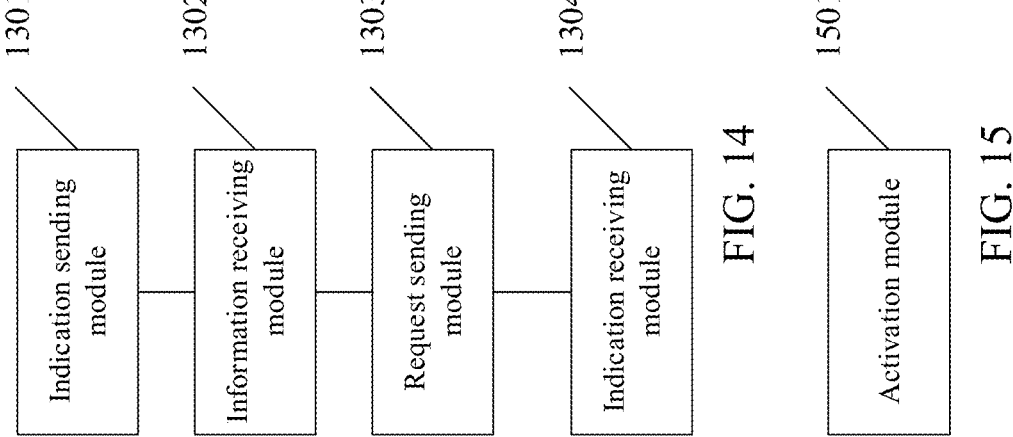
FIG. 14 shows a block diagram of a communication apparatus provided by an exemplary embodiment of the present application.
FIG. 15 shows a block diagram of a communication apparatus provided by an exemplary embodiment of the present application.

In one example, referring to FIG. 14, the apparatus further includes:

an information receiving module 1302, configured to receive configuration information, where the configuration information includes a corresponding relationship between the QoS parameter combination and the big data model; or, the configuration information includes a corresponding relationship between the connection identifier and the big data model; or, the configuration information includes a corresponding relationship between the data packet filter identifier and the big data model.

In one example, the connection is a QoS data stream.

In one example, the apparatus further includes:

a request sending module 1303, configured to send a session establishment request or a session modification request to the network device, where the session establishment request or the session modification request is used for instructing the network device to perform session establishment or modification;

the network device is used for establishing or modify the session with the terminal according to the session establishment request or the session modification request.

In one example, the apparatus further includes:

an indication receiving module 1304, configured to receive a second indication, where the second indication is used for triggering adjustment of the QoS parameter, and the adjustment of the QoS parameter includes selecting a first QoS parameter combination from the plurality of sets of QoS parameter combinations for activation.

FIG. 15 shows a block diagram of a communication apparatus provided by an exemplary embodiment of the present application, which is applied to the network device shown in FIG. 4, and the apparatus includes:

an activation module 1501, configured to select a first QoS parameter combination from a plurality of sets of QoS parameter combinations for activation;

where the plurality of sets of QoS parameter combinations correspond to one connection, or each set of QoS parameter combination in the plurality of sets of QoS parameter combinations corresponds to one connection.

Figure 16:
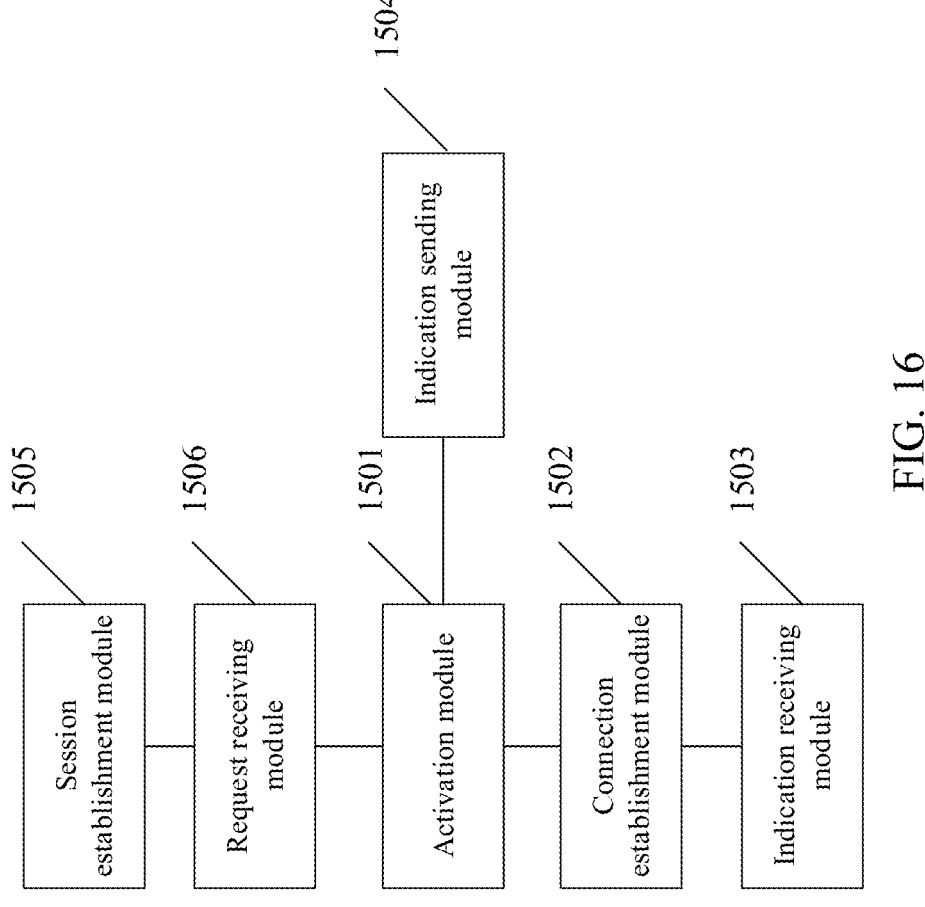
FIG. 16 shows a block diagram of a communication apparatus provided by an exemplary embodiment of the present application.

In one example, referring to FIG. 16, the apparatus further includes:

a connection establishment module 1502, configured to establish or modify the QoS parameter combination and one or more connections corresponding to the plurality of sets of QoS parameter combinations.

In one example, one or more connections are established between the network device and the first terminal, or one or more connections are established between the second terminal and the first terminal.

In one example, the connection establishment module 1502 is configured to establish, delete or modify DRBs corresponding to the plurality of sets of QoS parameter combinations.

In one example, the activation module 1501 is configured to activate a first QoS parameter combination corresponding to a big data model among the plurality of sets of QoS parameter combinations, where the big data model is a data model adopted by the terminal.

In one example, the first QoS parameter combination is determined based on a big data model, and the big data model is a data model adopted by the terminal.

In one example, the activation module 1501 is configured to determine a first QoS parameter combination corresponding to a first connection identifier, and activate the first QoS parameter combination;

the first connection identifier is determined based on the big data model, and the big data model is the data model adopted by the terminal.

In one example, the activation module 1501 is configured to determine the first QoS parameter combination corresponding to the first packet filter identifier, and activate the first QoS parameter combination;

the first data packet filter identifier is determined based on a big data model, and the big data model is a data model adopted by the terminal.

In one example, the apparatus further includes:

an indication receiving module 1503, configured to receive a first indication sent by the terminal or an application server, where the first indication is used for triggering adjustment of the QoS parameter, and the adjustment of QoS parameter includes selecting a first QoS parameter combination from the plurality of sets of QoS parameter combinations for activation.

In one example, the first indication is used for triggering the adjustment of the QoS parameter, including:

the first indication is used for indicating to select and activate a first connection from a plurality of connections, and each connection in the plurality of connections corresponds to one set of QoS parameter combination;

or, the first indication is used for indicating to select and activate the first QoS parameter combination from the plurality of sets of QoS parameter combinations, and the plurality of sets of QoS parameter combinations correspond to one connection.

In one example, the apparatus further includes:

an indication sending module 1504, configured to send a second indication to the terminal, where the second indication is used for triggering adjustment of the QoS parameter, and the adjustment of the QoS parameter includes selecting a first QoS parameter combination from the plurality of sets of QoS parameter combinations for activation.

In one example, the same set of data packet filters corresponds to a plurality of connections, and each of the plurality of connections corresponds to one set of QoS parameter combination.

In one example, the same set of data packet filters corresponds to a plurality of sets of QoS parameter combinations.

In one example, the connection is a QoS data stream.

In one example, the apparatus further includes:

a session establishment module 1505, configured to establish a session with the terminal.

In one example, the apparatus further includes:

a request receiving module 1506, configured to receive a session establishment request sent by the terminal, where the session establishment request is used for instructing the network device to perform session establishment;

a session establishment module, configured to establish a session with the terminal according to the session establishment request.

In one example, the network device includes a base station and a core network network element;

the core network network element is used for establishing a session with the base station and the terminal.

In one example, the core network network element includes a session management network element, a policy control network element and/or a subscription information management network element;

the session management network element is used to obtain the PCC rule from the policy control network element;

the session management network element is used to obtain subscription information from the subscription information management network element;

the session management network element is used for establishing a session with the base station and the terminal.

In one example, the PCC rule or subscription information includes at least one of a third indication, a plurality of sets of QoS parameter combinations, and one or more connections corresponding to the plurality of sets of QoS parameter combinations, and the third indication is used for instructing the terminal to allow triggering adjustment of the QoS parameter.

Figure 17:
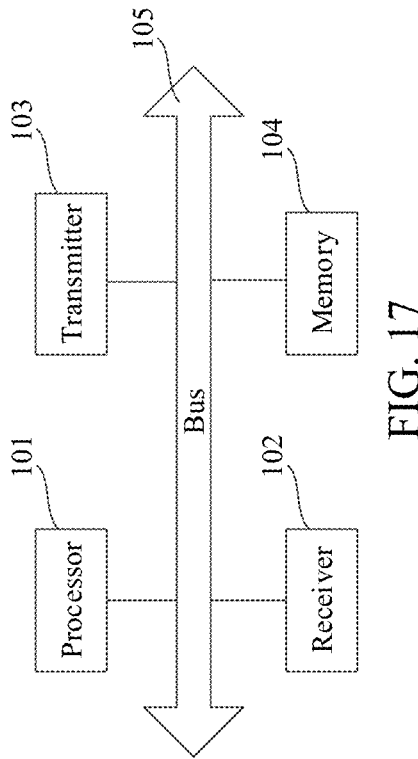
FIG. 17 shows a schematic structural diagram of a communication device provided by an exemplary embodiment of the present application.

FIG. 17 shows a schematic structural diagram of a communication device provided by an exemplary embodiment of the present application. The communication device (terminal or network device) includes: a processor 101, a receiver 102, a transmitter 103, a memory 104 and a bus 105.

The processor 101 includes one or more processing cores, and the processor 101 executes various functional applications and information processing by running software programs and modules.

The receiver 102 and the transmitter 103 may be implemented as one communication component, which may be one communication chip.

The memory 104 is connected to the processor 101 through the bus 105.

The memory 104 may be configured to store at least one instruction, and the processor 101 may be configured to execute the at least one instruction, so as to implement various steps in the foregoing method embodiments.

Additionally, the memory 104 may be implemented by any type or combination of volatile or non-volatile storage devices including, but not limited to, a magnetic or optical disk, an electrically erasable programmable Read Only Memory (EEPROM), an Erasable Programmable Read Only Memory (EPROM), a Static Anytime Access Memory (SRAM), a Read Only Memory (ROM), a magnetic memory, a flash memory, a Programmable Read Only Memory (PROM).

In an exemplary embodiment, a computer-readable storage medium is also provided, and executable instructions are stored in the readable storage medium. The executable instructions are loaded and executed by the processor to implement the method for adjusting the QoS parameter performed by the communication device provided by the above-mentioned various method embodiments.

Those of ordinary skill in the art can understand that all or part of the steps of implementing the above embodiments may be completed by hardware, or may be completed by instructing relevant hardware through a program, and the program may be stored in a computer-readable storage medium. The storage medium mentioned above may be a read-only memory, a magnetic disk or an optical disk, etc.

The above descriptions are only embodiments of the present application, and are not intended to limit the present application. Any modifications, equivalent replacements, improvements, etc. made within the spirit and principles of the present application shall be included in the protection scope of the present application.

What is claimed is:

1. A method for adjusting a communication parameter, performed by a first terminal, the method comprising:

sending a first indication to a first node, wherein the first indication is used for triggering an adjustment of a quality of service (QoS) parameter, the adjustment of the QoS parameter comprises selecting a first QoS parameter combination from a plurality of sets of QoS parameter combinations for activation, wherein the first indication being used for triggering the adjustment of the QoS parameter to indicate to:

select and activate a first connection from a plurality of connections, wherein each connection in the plurality of connections corresponds to one set of QoS parameter combination of the plurality of sets of QoS parameter combinations, wherein a same data packet filter set corresponds to the plurality of connections; or select and activate the first QoS parameter combination from the plurality of sets of QoS parameter combinations, wherein the plurality of sets of QoS parameter combinations correspond to one connection, wherein a same data packet filter set corresponds to the plurality of sets of QoS parameter combinations.

2. The method according to claim 1, wherein the first node is a network device, or the first node is a second terminal.

3. The method according to claim 1, wherein the plurality of sets of QoS parameter combinations correspond to one or more connections.

4. The method according to claim 3, wherein the one or more connections are established between the first terminal and a network device, or the one or more connections are established between the first terminal and a second terminal.

5. The method according to claim 3, wherein the plurality of sets of QoS parameter combinations are used for establishing a plurality of data radio bearers (DRBs), and resources corresponding to the plurality of DRBs are allocated by a network device.

6. The method according to claim 1, wherein the plurality of sets of QoS parameter combinations are established by a network device through a session establishment process or a session modification process.

7. An apparatus for adjusting a communication parameter, applied to a first terminal, the apparatus comprising:
a processor;
a transceiver connected to the processor; and
a memory for storing executable instructions for the processor;
wherein the processor is configured to load and execute the executable instructions to:
send a first indication to a first node, wherein the first indication is used for triggering an adjustment of a quality of service (QoS) parameter, the adjustment of the QoS parameter comprises selecting a first QoS parameter combination from a plurality of sets of QoS parameter combinations for activation,
wherein the first indication being used for triggering the adjustment of the QoS parameter to indicate to:
select and activate a first connection from a plurality of connections, wherein each connection in the plurality of connections corresponds to one set of QoS parameter combination of the plurality of sets of QoS parameter combinations, wherein a same data packet filter set corresponds to the plurality of connections; or
select and activate the first Qos parameter combination from the plurality of sets of QoS parameter combinations, wherein the plurality of sets of QoS parameter combinations correspond to one connection,
wherein a same data packet filter set corresponds to the plurality of sets of QoS parameter combinations.

8. The apparatus according to claim 7, wherein:
the first QoS parameter combination is determined based on a big data model, and the big data model is a model used by the first terminal.

9. The apparatus according to claim 7, wherein:
a first connection identifier is determined based on a big data model, and the big data model is a model used by the first terminal;
the first connection identifier corresponds to the first QoS parameter combination.

10. The apparatus according to claim 7, wherein:
a first packet filter identifier is determined based on a big data model, and the big data model is a model used by the first terminal;
the first packet filter identifier corresponds to the first QoS parameter combination.

11. The apparatus according to claim 8, wherein the processor is further configured to:
receive configuration information, wherein the configuration information comprises a corresponding relationship between the first QoS parameter combination and the big data model; or, the configuration information comprises a corresponding relationship between a connection identifier and the big data model; or, the configuration information comprises a corresponding relationship between a data packet filter identifier and the big data model.

12. The apparatus according to claim 8, wherein the first connection is a QoS data stream.

13. The apparatus according to claim 7, wherein the processor is further configured to:
send a session establishment request or a session modification request to a network device, wherein the session establishment request or the session modification request is used for instructing the network device to perform a session establishment or a session modification;
the network device being configured to establish or modify a session with the first terminal according to the session establishment request or the session modification request.

14. The apparatus according to claim 7, wherein the processor is further configured to:
receive a second indication, wherein the second indication is used for triggering the adjustment of the QoS parameter, and the adjustment of the QoS parameter comprises selecting the first QoS parameter combination from the plurality of sets of QoS parameter combinations for activation.

15. An apparatus for adjusting a communication parameter, applied to a network device or a second terminal, the apparatus comprising:
a processor;
a transceiver connected to the processor; and
a memory for storing executable instructions for the processor;
wherein the processor is configured to load and execute the executable instructions to:
receive a first indication from a first terminal to select a first QoS parameter combination from a plurality of sets of QoS parameter combinations for activation, the first indication being used for indicating to:
select and activate a first connection from a plurality of connections, wherein each connection in the plurality of connections corresponds to one set of QoS parameter combination of the plurality of sets of QoS parameter combinations, wherein a same data packet filter set corresponds to the plurality of connections; or
select and activate the first QoS parameter combination from the plurality of sets of QoS parameter combinations, wherein the plurality of sets of QoS parameter combinations correspond to one connection;
wherein a same data packet filter set corresponds to the plurality of sets of QoS parameter combinations.

16. The apparatus according to claim 15, wherein the processor is further configured to:
establish or modify the plurality of sets of QoS parameter combinations and one or more connections corresponding to the plurality of sets of QoS parameter combinations.

17. The apparatus according to claim 16, wherein the one or more connections are established between the network device and the first terminal in a case that the apparatus is applied to the network device, or the one or more connections are established between the second terminal and the first terminal in a case that the apparatus is applied to the second terminal.

* * * * *